(12) United States Patent
Won

(10) Patent No.: US 11,454,368 B2
(45) Date of Patent: Sep. 27, 2022

(54) LAMP FOR VEHICLE AND VEHICLE INCLUDING SAME

(71) Applicant: HYUNDAI MOBIS CO., LTD., Seoul (KR)

(72) Inventor: Yong Hee Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/222,029

(22) Filed: Apr. 5, 2021

(65) Prior Publication Data

US 2021/0317967 A1    Oct. 14, 2021

(30) Foreign Application Priority Data

Apr. 9, 2020  (KR) .......................... 10-2020-0043376

(51) Int. Cl.
| | |
|---|---|
| *F21S 41/675* | (2018.01) |
| *F21S 41/24* | (2018.01) |
| *F21S 41/30* | (2018.01) |
| *G02B 27/10* | (2006.01) |

(52) U.S. Cl.
CPC ............. *F21S 41/675* (2018.01); *F21S 41/24* (2018.01); *F21S 41/30* (2018.01); *G02B 27/10* (2013.01)

(58) Field of Classification Search
CPC ........... F21S 41/675; F21S 41/24; F21S 41/30
See application file for complete search history.

(56) References Cited

U.S. PATENT DOCUMENTS

| | | | |
|---|---|---|---|
| 8,570,244 B2 * | 10/2013 | Mukawa | G02B 27/0176 345/8 |
| 10,697,605 B2 * | 6/2020 | Kogure | F21S 41/285 |
| 10,823,352 B2 * | 11/2020 | Yamamura | F21S 41/135 |
| 11,102,468 B2 * | 8/2021 | Huang | G02B 26/0833 |
| 2020/0158305 A1 * | 5/2020 | Chen | F21S 41/255 |

FOREIGN PATENT DOCUMENTS

| | | |
|---|---|---|
| JP | 2015123855 A | 7/2015 |
| JP | 2017117725 A | 6/2017 |
| JP | 2019204711 A | 11/2019 |
| WO | 2020/067337 A | 4/2020 |

* cited by examiner

*Primary Examiner* — Matthew J. Peerce
(74) *Attorney, Agent, or Firm* — NovoTechIP International PLLC

(57) ABSTRACT

Disclosed are a lamp for a vehicle and a vehicle including the lamp. A lamp for a vehicle according to one aspect of the present disclosure includes: a light source configured to emit first light; and a beam splitter configured to form transmitted light by transmitting a part of the first light and form reflected light by reflecting another part of the first light, in which the transmitted light transmitted through the beam splitter and the reflected light reflected by the beam splitter form beam patterns outside.

9 Claims, 4 Drawing Sheets

LAMP FOR VEHICLE AND VEHICLE INCLUDING SAME

CROSS-REFERENCE TO RELATED APPLICATION

This application claims priority to and the benefit of Korean Patent Application No. 10-2020-0043376 filed in the Korean Intellectual Property Office on Apr. 9, 2020, the entire contents of which are incorporated herein by reference.

TECHNICAL FIELD

The present disclosure relates to a lamp for a vehicle, and a vehicle including the lamp.

BACKGROUND ART

A digital micro-mirror device (DMD) is configured to include an array of micro-mirrors and to implement predetermined patterns or images by individually controlling angles of the micro-mirrors using micro-currents. Each of the micro-mirrors, which constitute the DMD, corresponds to a pixel constituting a single pattern or image, such that it is possible to implement precise patterns or images by individually controlling the micro-mirrors provided in the DMD.

Meanwhile, recently, the DMD is sometimes mounted in a headlamp for a vehicle. The DMD mounted in the headlamp for a vehicle serves to display predetermined information on a road surface. Alternatively, the DMD performs a function of an adaptive driving beam (ADB) that forms a dark portion only in a corresponding region in which another vehicle or a pedestrian exists in front of the vehicle, thereby ensuring a visual field of a driver and preventing light blindness from being caused to pedestrians or drivers in other vehicles.

However, in the related art, because the DMD cannot serve to provide a low beam necessarily required for the headlamp for a vehicle, a lamp module for forming a low beam needs to be mounted in the vehicle even though a lamp module including the DMD is mounted in the vehicle. For this reason, there is a problem in that a large number of components and a large volume are required to configure the headlamp.

SUMMARY OF THE INVENTION

An object of the present disclosure is to allow a single lamp module to implement various types of beam patterns, thereby reducing the number of components and a volume required to configure a headlamp for a vehicle and simplifying a process of manufacturing the headlamp.

In order to achieve the above-mentioned object, one aspect of the present disclosure provides a lamp for a vehicle, the lamp including: a light source configured to emit first light; and a beam splitter configured to form transmitted light by transmitting a part of the first light and form reflected light by reflecting another part of the first light, in which the transmitted light transmitted through the beam splitter and the reflected light reflected by the beam splitter form beam patterns outside.

The lamp may further include a reflector configured to reflect again the reflected light reflected by the beam splitter, in which the reflected light reflected by the reflector forms a beam pattern outside.

The lamp may further include a digital micro-mirror device (DMD) configured to reflect again the reflected light reflected by the reflector, in which the reflected light reflected by the DMD forms a beam pattern outside.

The lamp may further include an illumination unit provided between the light source and the beam splitter and configured to transmit the first light emitted from the light source, in which the illumination unit includes: a light guide configured to receive the first light emitted from the light source and send the first light forward; and a collimator configured to convert the first light sent from the light guide into parallel light and send the parallel light to the beam splitter.

The lamp may further include a spread unit configured to disperse the transmitted light transmitted through the beam splitter.

The lamp may further include a projection unit configured to transmit the reflected light reflected by the DMD.

A direction in which the DMD and the projection unit are disposed may be parallel to a direction in which the light source and the illumination unit are disposed.

The lamp may further include a PCB to which the light source and the DMD are attached, in which the light source and the DMD are attached onto the single PCB.

The beam pattern formed by the transmitted light transmitted through the beam splitter and the beam pattern formed by the reflected light reflected by the beam splitter may partially overlap each other.

A region in which the beam pattern formed by the transmitted light and the beam pattern formed by the reflected light overlap each other may form a part of a low beam pattern.

In order to achieve the above-mentioned object, another aspect of the present disclosure provides a vehicle including: a lamp for a vehicle, in which the lamp for a vehicle includes: a light source configured to emit first light; and a beam splitter configured to form transmitted light by transmitting a part of the first light and form reflected light by reflecting another part of the first light, in which the transmitted light transmitted through the beam splitter and the reflected light reflected by the beam splitter form beam patterns outside.

The vehicle may further include: a reflector configured to reflect again the reflected light reflected by the beam splitter; and a DMD configured to reflect again the reflected light reflected by the reflector, in which the DMD may include a plurality of micro-mirrors, and the reflected light reflected by the DMD may form a beam pattern outside, and the plurality of micro-mirrors of the DMD may be individually controlled, such that a plurality of types of beam patterns may be formed outside by the reflected light reflected by the DMD.

According to the present disclosure, the single lamp module may implement various types of beam patterns, thereby reducing the number of components and a volume required to configure a headlamp for a vehicle and simplifying a process of manufacturing the headlamp.

DETAILED DESCRIPTION

Hereinafter, a lamp for a vehicle according to the present disclosure will be described with reference to the drawings.

Lamp for Vehicle

Figure 1:
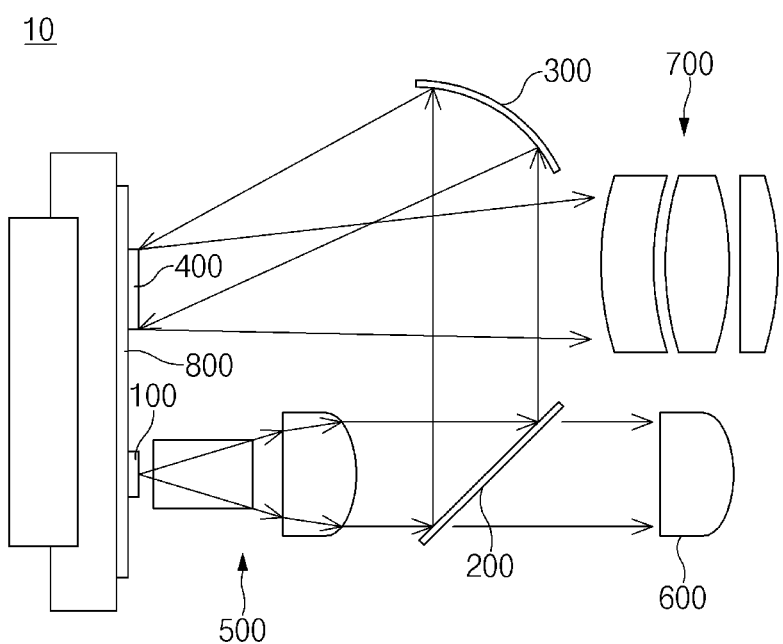
FIG. 1 is a side view schematically illustrating a structure of a lamp for a vehicle according to the present disclosure.
Figure 2:
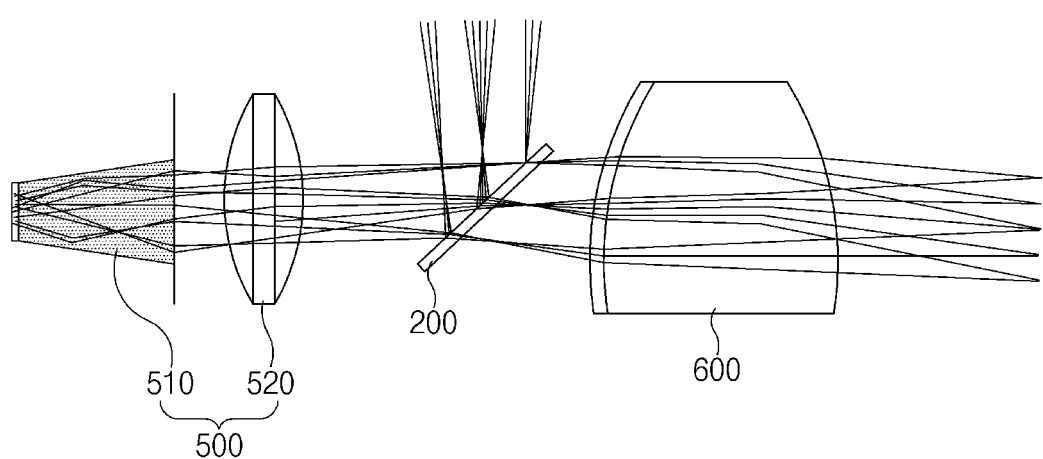
FIG. 2 is an enlarged side view illustrating an example of a structure including an illumination unit, a beam splitter, and a spread unit that may be applied to the lamp for a vehicle according to the present disclosure.
Figure 3:
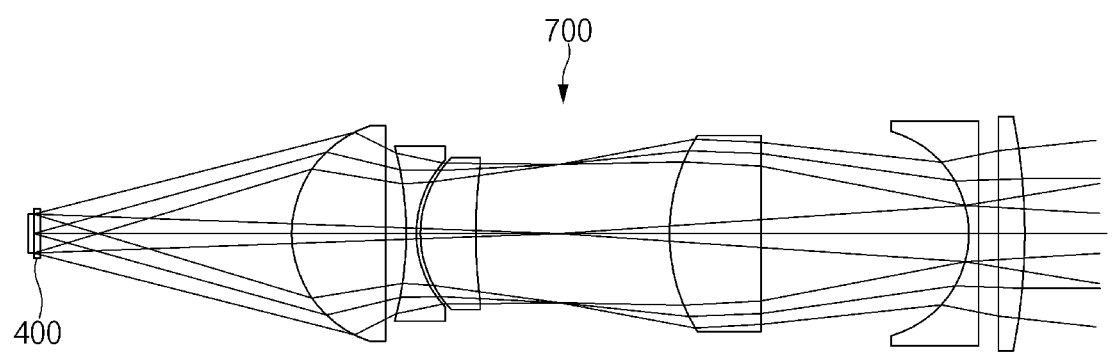
FIG. 3 is an enlarged side view illustrating an example of a structure of a projection unit that may be applied to the lamp for a vehicle according to the present disclosure.

FIG. 1 is a side view schematically illustrating a structure of a lamp for a vehicle according to the present disclosure, and FIG. 2 is an enlarged side view illustrating an example of a structure including an illumination unit, a beam splitter, and a spread unit that may be applied to the lamp for a vehicle according to the present disclosure. Further, FIG. 3 is an enlarged side view illustrating an example of a structure of a projection unit that may be applied to the lamp for a vehicle according to the present disclosure.

As illustrated in FIG. 1, a lamp 10 for a vehicle (hereinafter, referred to as a 'lamp') according to the present disclosure may include a light source 100 configured to emit first light. For example, the light source 100 may be a light emitting diode (LED), but the present disclosure is not limited thereto, and various types of light sources may be used.

In addition, the lamp 10 may include a beam splitter 200 which transmits a part of the first light emitted from the light source 100 to form transmitted light from the part of the first light and reflects another part of the first light to form reflected light from another part of the first light. In the present specification, the part of the first light, which is emitted from the light source 100 and transmitted through the beam splitter 200, is referred to as the 'transmitted light', and the part of the first light which is emitted from the light source 100 and reflected by the beam splitter 200, is referred to as the 'reflected light'.

The beam splitter refers to an optical element that divides the incident light into two types of light on the basis of a predetermined ratio. The beam splitter may be classified into a cube-type beam splitter and a plate-type beam splitter. The beam splitter 200 of the lamp 10 according to the present disclosure may also be the cube-type beam splitter or the plate-type beam splitter.

Referring to FIG. 1, the transmitted light transmitted through the beam splitter 200 may propagate forward through the beam splitter 200, and the reflected light reflected by the beam splitter 200 may propagate upward. However, unlike the configuration illustrated in FIG. 1, the reflected light reflected by the beam splitter 200 may propagate downward.

According to the present disclosure, the transmitted light transmitted through the beam splitter 200 and the reflected light reflected by the beam splitter 200 propagate to the outside, thereby forming a predetermined beam pattern. Therefore, according to the present disclosure, the first light emitted from the light source 100 is divided into the transmitted light and the reflected light by the beam splitter 200, and the transmitted light and the reflected light propagate to the outside along different routes, such that various types of beam patterns may be formed by the single light source. For example, as described below, the transmitted light may serve as a low beam. The reflected light may serve as an adaptive driving beam (ADB) that forms a dark portion only in a corresponding region in which another vehicle or a pedestrian exists in front of the vehicle, thereby ensuring a visual field of a driver and preventing light blindness from being caused to the pedestrian or the driver in another vehicle. The reflected light may also serve to display predetermined information on a road surface and may form a part of the low beam.

Continuing to refer to FIG. 1, the lamp 10 according to the present disclosure may further include a reflector 300 configured to reflect the incident light. The reflector 300 is configured to reflect again the reflected light reflected by the beam splitter 200. As illustrated in FIG. 1, in the case in which the reflected light reflected by the beam splitter 200 propagates upward, the reflector 300 may be provided above the beam splitter 200. However, unlike the configuration illustrated in FIG. 1, the reflector 300 may be provided below the beam splitter 200 in the case in which the reflected light reflected by the beam splitter 200 propagates downward.

According to the present disclosure, the reflected light reflected by the beam splitter 200 is reflected again by the reflector 300 and then propagates to the outside, thereby forming the beam pattern.

In addition, as illustrated in FIG. 1, the lamp 10 according to the present disclosure may further include a digital micro-mirror device (DMD) 400 configured to reflect the reflected light reflected again by the reflector 300.

The DMD includes a large number of micro-mirrors and may be configured to implement a predetermined beam pattern by individually controlling angles of the micro-mirrors using micro-currents. According to the present disclosure, the reflected light reflected again by the DMD 400 may propagate to the outside, thereby forming the beam pattern.

In particular, since the angles of the large number of micro-mirrors provided in the DMD 400 are individually controlled, it is possible to implement various types of beam patterns by using the DMD 400. For example, the DMD 400 may be used to implement a beam pattern for displaying predetermined information on a road surface or implement a beam pattern having a dark portion formed in a corresponding region in which another vehicle or a pedestrian exists in front of the vehicle.

Meanwhile, the lamp 10 according to the present disclosure may have a plurality of optical systems. Hereinafter, the optical systems will be described in detail.

Referring to FIGS. 1 and 2, the lamp 10 according to the present disclosure may include an illumination unit 500 provided between the light source 100 and the beam splitter 200 and configured to transmit the first light emitted from the light source 100. According to the present disclosure, the illumination unit 500 may include a light guide 510 configured to receive the first light emitted from the light source 100 and send the first light forward, and a collimator 520 configured to convert the first light sent from the light guide 510 into parallel light and send the parallel light to the beam splitter 200. The light guide 510 may concentrate the first light emitted from the light source 100 and supply the concentrated first light to the collimator 520, thereby preventing the first light emitted from the light source 100 from dispersing. For example, the light guide 510 may have a structure having an inner surface coated with a reflective material (not illustrated) such that the first light supplied to the light guide 510 may move while being reflected in the light guide 510.

In addition, as illustrated in FIGS. 1 and 2, the lamp 10 according to the present disclosure may further include a spread unit 600 configured to disperse the transmitted light transmitted through the beam splitter 200. According to the present disclosure, the spread unit 600 may disperse the transmitted light transmitted through the beam splitter 200, thereby expanding a width of the beam pattern formed by the lamp 10 according to the present disclosure. In particular, the lamp 10 according to the present disclosure may form a low beam, and the spread unit 600 may be configured to form a peripheral region of the beam pattern for forming the low beam. For example, the spread unit 600 may include a single lens configured to disperse the parallel incident light in an upward/downward direction and a left-right direction.

Meanwhile, as illustrated in FIGS. 1 and 3, the lamp 10 according to the present disclosure may further include a projection unit 700 configured to transmit the reflected light reflected by the DMD 400. The reflected light reflected by the DMD 400 may be transmitted through the projection unit 700 and then form various types of beam patterns. For example, the reflected light transmitted through the projection unit 700 may form a part of the low beam, serve as the ADB, or serve to display predetermined information on a road surface. As illustrated in FIG. 3, the projection unit 700 may have a lens array structure in which variously shaped lenses are combined. However, the structure of the projection unit 700 is not limited to that illustrated in FIG. 3.

Meanwhile, as illustrated in FIG. 1, according to the present disclosure, a direction in which the DMD 400 and the projection unit 700 are disposed and a direction in which the light source 100 and the illumination unit 500 are disposed may be parallel to each other. More particularly, the direction in which the DMD 400 and the projection unit 700 are disposed may be parallel to the direction in which the light source 100, the illumination unit 500, the beam splitter 200, and the spread unit 600 are disposed. Therefore, according to the present disclosure, an optical path of the transmitted light, which is implemented as the first light emitted from the light source 100 is transmitted through the beam splitter 200, may be parallel to an optical path of the reflected light after being reflected by the DMD 400, in which the optical path of the reflected light after being reflected by the DMD 400 is a part of an optical path of the reflected light, which is implemented as the first light is reflected by the beam splitter 200.

Meanwhile, the lamp 10 according to the present disclosure may further include a printed circuit board (PCB) 800 to which the light source 100 and the DMD 400 are attached. In this case, as illustrated in FIG. 1, the light source 100 and the DMD 400 may be attached onto the single PCB 800. More particularly, the light source 100 and the DMD 400 may be provided on the same plane on the PCB 800.

In the case of a lamp for a vehicle mounted with a DMD in the related art, light generated by a light source needs to directly enter a reflector because there is no beam splitter. However, in this case, because an optical path along which the light generated by the light source enters the reflector needs to intersect an optical path along which the light is reflected by the DMD and then enters a projection unit, an imaginary plane including a surface of a board on which the light source is installed also intersects an imaginary plane including a surface of the board on which the DMD is installed. Therefore, the board on which the light source is installed and the board on which the DMD is installed need to be separately provided.

Meanwhile, the board to which the light source is attached and the board to which the DMD is attached are generally attached to a heat dissipation unit for dissipating heat generated from the lamp to the outside. In the related art, in order to dispose the light source and the DMD, the heat dissipation unit inevitably has an angled portion corresponding to an angle defined between the board on which the light source is installed and the board on which the DMD is installed. However, if the heat dissipation unit has the above-mentioned structure, it is difficult to manage tolerance of the heat dissipation unit and components around the heat dissipation unit, which causes a deterioration in assembly properties. Further, because components are required to fix the board to which the light source is attached and the board to which the DMD is attached to the heat dissipation unit, the number of components required to manufacture the lamp is also increased.

However, according to the present disclosure, since the light source 100 and the DMD 400 may be attached to the single PCB 800, a portion of the heat dissipation unit to which the PCB is fixed may have a planar shape. Therefore, according to the present disclosure, the assembly property of the lamp may be improved, and the number of components required to manufacture the lamp may be reduced.

Figure 4:
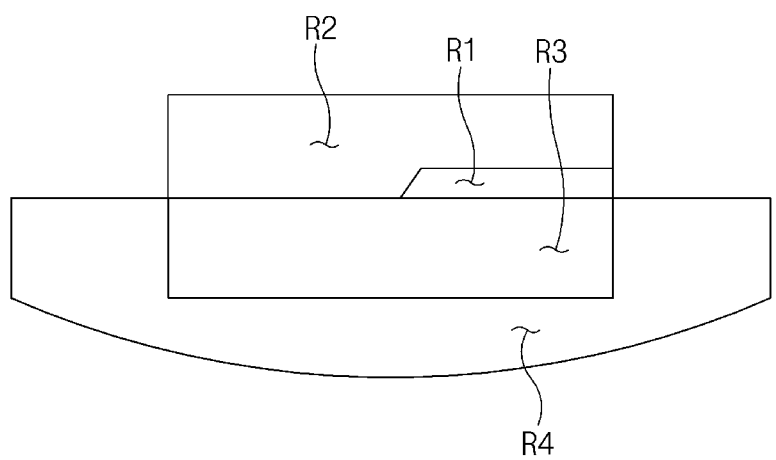
FIG. 4 is a view illustrating respective regions of a beam pattern that may be formed by the lamp for a vehicle according to the present disclosure.

FIG. 4 is a view illustrating respective regions of a beam pattern that may be formed by the lamp for a vehicle according to the present disclosure.

Referring to FIG. 4, the beam pattern formed by the lamp according to the present disclosure may be divided into a first region R1, a second region R2, a third region R3, and a fourth region R4.

The first region R1 is a region formed by the reflected light and may form a part of the low beam. In more detail, the first region R1 may form a cut-off region having a stepped shape formed at an upper end of the low beam.

The second region R2 is also a region formed by the reflected light and may form an ADB. In more detail, when a pedestrian or another vehicle exists in front of the vehicle at night, the angles of the plurality of micro-mirrors provided in the DMD 400 (see FIG. 1) are individually controlled, such that a dark portion region may be formed in the region, in the second region R2, in which the pedestrian or another vehicle exists in front of the vehicle.

The third region R3 is a region that the reflected light and the transmitted light simultaneously reach. The third region R3 may define a central region of the low beam with relatively high luminous intensity. That is, according to the present disclosure, the third region R3 may be understood as a region in which the reflected light and the transmitted light overlap each other. In more detail, according to the present disclosure, the beam pattern, which is formed outside the vehicle by the transmitted light transmitted through the beam splitter 200 (see FIG. 1), and the beam pattern, which is formed outside the vehicle by the reflected light reflected by the beam splitter, may partially overlap each other. For example, the region in which the beam pattern formed by the transmitted light and the beam pattern formed by the reflected light overlap each other may form a part of the low beam pattern formed by the lamp according to the present disclosure. More particularly, the region in which the beam pattern formed by the transmitted light and the beam pattern formed by the reflected light overlap each other may form the central region of the low beam with relatively high luminous intensity.

The fourth region R4 is a region formed by the transmitted light and may form a peripheral region of the low beam with relatively low luminous intensity. As described above, according to the present disclosure, since the lamp for a vehicle having the DMD may form the fourth region R4, it is possible to implement the low beam having a wide-ranging beam pattern shape without a separate module.

Vehicle

A vehicle according to the present disclosure may include the lamp 10. In this case, the lamp 10 may be a headlamp.

In this case, referring to FIG. 1, the lamp 10 may include the light source 100 configured to emit the first light, and the beam splitter 200 configured to form the transmitted light by transmitting a part of the first light and form the reflected light by reflecting another part of the first light. In this case, the transmitted light transmitted through the beam splitter 200 and the reflected light reflected by the beam splitter 200 may propagate to the outside, thereby forming the beam pattern.

Meanwhile, the lamp 10 for a vehicle according to the present disclosure may further include the reflector 300 configured to reflect again the reflected light reflected by the beam splitter 200, and the DMD 400 configured to reflect again the reflected light reflected by the reflector 300. The DMD 400 may include the plurality of micro-mirrors.

In this case, the reflected light reflected by the DMD 400 propagates to the outside, thereby forming the beam pattern. As the plurality of micro-mirrors provided in the DMD 400 is individually controlled, a plurality of types of beam patterns may be formed outside the vehicle by the reflected light reflected by the DMD 400. In more detail, since the angles of the plurality of micro-mirrors provided in the DMD 400 are individually controlled, a plurality of types of beam patterns may be formed.

The present disclosure has been described with reference to the limited exemplary embodiments and the drawings, but the present disclosure is not limited thereto. The described exemplary embodiments may be carried out in various forms by those skilled in the art to which the present disclosure pertains within the technical spirit of the present disclosure and within the scope equivalent to the appended claims.

What is claimed is:

1. A lamp configured to output a light beam having an output beam pattern, comprising:
    a printed circuit board (PCB) having a plane surface;
    a light source mounted on the plane surface of the PCB and configured to emit a light beam;
    a beam splitter configured to:
        transmit a first portion of the light beam emitted from the light source; and
        reflect a second portion of the light beam emitted from the light source;
    a reflector configured to reflect the second portion of the light beam reflected by the beam splitter; and
    a digital micro-mirror device (DMD) mounted on the plane surface of the PCB along with the light source and configured to reflect the second portion of the light beam reflected by the reflector,
    wherein the light beam output from the lamp comprises the first portion of the light beam transmitted by the beam splitter and the second portion of light beam reflected by the DMD.

2. The lamp of claim 1, further comprising an illumination unit positioned between the light source and the beam splitter, the illumination unit comprising a light guide and a collimator, wherein:
    the light guide is configured to transmit the light beam emitted from the light source to the collimator, and
    the collimator is configured to convert the light beam transmitted from the light guide into a parallel light beam and transmit the parallel light beam to the beam splitter.

3. The lamp of claim 1, further comprising a spread unit configured to disperse the first portion of the light beam transmitted from the beam splitter.

4. The lamp of claim 2, further comprising a projection unit configured to transmit the second portion of the light beam reflected by the DMD.

5. The lamp of claim 4, wherein the DMD and the projection unit are disposed in a first direction parallel to a second direction in which the light source and the illumination unit are disposed.

6. The lamp of claim 1, wherein the first portion of the light beam transmitted from the beam splitter and the second portion of the light beam reflected by the DMD partially overlap each other outside the lamp.

7. The lamp of claim 6, wherein an overlapping region between the first portion of the light beam transmitted from the beam splitter and the second portion of the light beam reflected by the DMD constitutes a part of a low beam pattern.

8. A vehicle comprising the lamp of claim 1.

9. The vehicle of claim 8,
    wherein the DMD comprises a plurality of micro-mirrors individually controlled to change the output beam pattern.

* * * * *